(12) United States Patent
Chusing et al.

(10) Patent No.: US 9,632,987 B2
(45) Date of Patent: Apr. 25, 2017

(54) TECHNIQUE THAT ENHANCES THE MANIPULATION OF AN HTML TREE PRESENTATION BY USING AN ARRAY REPRESENTATION OF THE HIERARCHICAL PATH OF A TREE NODE

(75) Inventors: Trevett B. Chusing, Grimsby (CA); Lei Zhang, Markham (CA); Jian Zhu, Scarborough (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2165 days.

(21) Appl. No.: 11/968,278

(22) Filed: Jan. 2, 2008

(65) Prior Publication Data
US 2009/0172602 A1 Jul. 2, 2009

(51) Int. Cl.
*G06F 17/00* (2006.01)
*G06F 17/22* (2006.01)

(52) U.S. Cl.
CPC .............. *G06F 17/2247* (2013.01)

(58) Field of Classification Search
None
See application file for complete search history.

(56) References Cited

U.S. PATENT DOCUMENTS

| | | | |
|---|---|---|---|
| 2002/0042750 A1* | 4/2002 | Morrison | 705/26 |
| 2003/0063134 A1* | 4/2003 | Lord et al. | 345/853 |
| 2004/0205638 A1* | 10/2004 | Thomas et al. | 715/526 |
| 2007/0192080 A1 | 8/2007 | Carpenter et al. | |
| 2007/0198930 A1 | 8/2007 | Chu et al. | |
| 2008/0104025 A1* | 5/2008 | Dharamshi et al. | 707/3 |

* cited by examiner

*Primary Examiner* — Keith Bloomquist
(74) *Attorney, Agent, or Firm* — Cuenot, Forsythe & Kim, LLC

(57) ABSTRACT

The present invention discloses a method for manipulating the presentation of an AJAX tree using an array representing the hierarchical path of a tree node. Such a method can begin with the receipt of a user-request to expand a selected tree node of an AJAX tree in a Web page. Next, it can be determined if the tree node is present in the existing path array. When the tree node is present in the existing path array, the existing path array can be modified for the selected tree node. A new path array can be requested from the AJAX engine when the tree node does not exist in the existing path array. A path array handler can be invoked to expand the AJAX tree using the existing path array.

19 Claims, 3 Drawing Sheets

200

Sample Path Array Handler 300

```
305  expandByPath : function (path, idx) {
310      var _this = this ;
                                        307
315      if (!idx) idx = 0 ;
320      if (path[idx + 1]) {
325          var deferred = this.expand (dojo.widget.byId (path[idx]), false) ;
330          deferred.addCallBack (function ( ) {_this.expandByPath (path, idx+1); }) ;
         }
335      else {
340          if (this.selector) {
345              var ts = dojo.widget.byId (this.selector) ;
350              if (ts) {
355                  ts.reselect (dojo.widget.byId (path.pop ( ) ), true) ;
                 }
             }
         }
     }
```

FIG. 3

TECHNIQUE THAT ENHANCES THE MANIPULATION OF AN HTML TREE PRESENTATION BY USING AN ARRAY REPRESENTATION OF THE HIERARCHICAL PATH OF A TREE NODE

BACKGROUND

Field of the Invention

The present invention relates to the field of Web page data presentation and, more particularly, to using an array representation of the hierarchical path of a tree node to enhance the manipulation of an HTML tree (e.g., an AJAX tree) in a Web page.

Description of the Related Art

The use of Asynchronous JavaScript and XML (AJAX) within Web pages and applications is increasing in popularity. AJAX allows for Web page content to be loaded and updated seamlessly without reloading the entire Web page. For example, a Web page can use AJAX to verify credit card information entered into a Web form before the user hits the submit button.

A popular use of AJAX is for presenting data in a tree structure. An AJAX tree allows for the incremental loading of the tree data into the Web page. For example, only the tree branch selected by a user for expansion is loaded into the Web page, not all branches of the tree. This approach provides a quick response for user interactions, increasing user satisfaction and usability.

Conventional implementations of AJAX trees use arrays of objects or text strings to represent the path of a user-selected tree node for expansion. However, these approaches require the request of a new object array or text string for every user-selected tree node, even if the selected tree node is contained within the path of the previously-selected tree node.

Further, these data structures require handlers for processing that addresses its special format, which often cannot be used with other implementations of AJAX trees. For example, Text String Parser A can only work with text strings from AJAX Engine A, which uses the same set of rules as Parser A, which can be incompatible with an AJAX Engine B.

What is needed is a general technique that enhances the manipulation of AJAX trees. That is, the technique would utilize an array data structure to define the path hierarchy of a user-selected tree node. Ideally, such a technique would extend the capabilities of existing AJAX tree implementations.

SUMMARY OF THE INVENTION

The present invention discloses a technique for manipulating the presentation of an HTML tree (e.g., AJAX tree) using an array representing the hierarchical path of a tree node. This technique can represent the hierarchical ancestry of a tree node in a path array data structure. The path array can be searched and modified to alter the presentation of the AJAX tree without having to send additional requests to the AJAX engine. The path can also be stored to save the current expanded state of the AJAX tree to accommodate the use of Web page navigation controls.

The present invention can be implemented in accordance with numerous aspects consistent with material presented herein. For example, one aspect of the present invention can include a method for manipulating the presentation of an AJAX tree using an array representing the hierarchical path of a tree node. Such a method can begin with the receipt of a user-request to expand a selected tree node of an AJAX tree in a Web page. Next, it can be determined if the tree node is present in the existing path array. When the tree node is present in the existing path array, the existing path array can be modified for the selected tree node. A new path array can be requested from the AJAX engine when the tree node does not exist in the existing path array. A path array handler can be invoked to expand the AJAX tree using the existing path array.

Another aspect of the present invention can include a system that enhances the manipulation of an AJAX tree presentation using an array to represent the hierarchical path of a tree node. Such a system can include an AJAX tree, an AJAX engine, and a path array handler. The AJAX engine can be configured to provide a path array for a user-selected tree node of the AJAX tree. The path array can contain data elements that represent the hierarchy of tree nodes for the user-selected node in the AJAX tree. The path array handler can be configured to process the path array to alter the presentation of the AJAX tree.

Still another aspect of the present invention can include a Web page that utilizes an array representation of a user-selected tree node to manipulate the presentation of an AJAX tree. Such a Web page can include a path array and a path array handler. The path array can be configured to contain data elements that represent a hierarchical order of tree nodes for a presented AJAX tree. In the path array, the first data element can correspond to the root node of the AJAX tree and the last data element can correspond to the user-selected tree node. The path array handler can be configured to process the data elements of the path array to alter the presentation of the AJAX tree in the Web page.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

FIG. 3 is a sample path array handler for using an array representing the hierarchical path of a tree node to manipulate an HTML tree

DETAILED DESCRIPTION OF THE INVENTION

Figure 1:
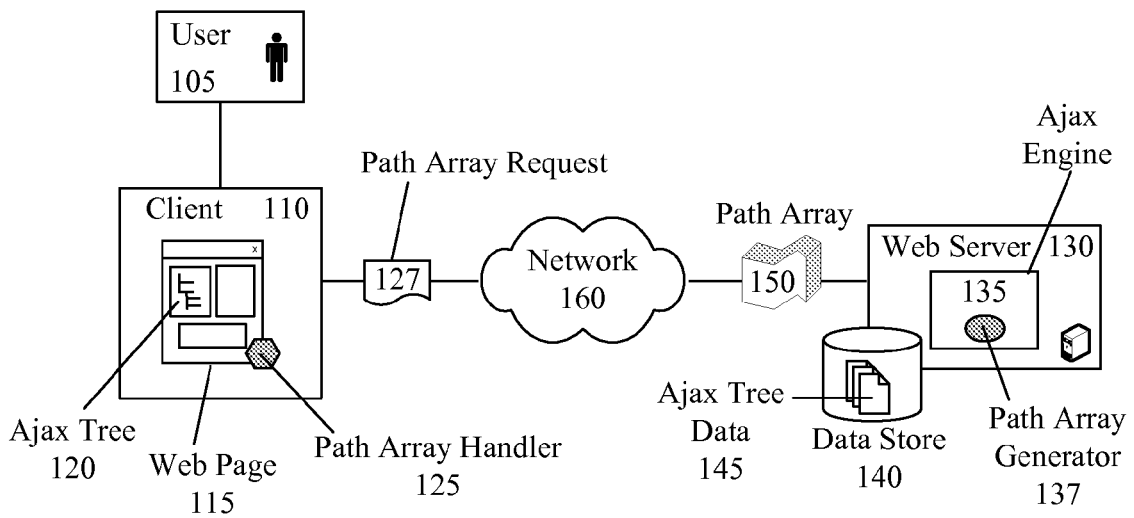
FIG. 1 is a schematic diagram of a system that utilizes an array to enhance the manipulation of an HTML tree in accordance with embodiments of the inventive arrangements disclosed herein.

FIG. 1 is a schematic diagram of a system 100 that utilizes an array 150 to enhance the manipulation of an HTML (AJAX) tree 120 in accordance with embodiments of the inventive arrangements disclosed herein. The HTML tree can be a software artifact used in conjunction with a data processing model, which allows tree content to be loaded and updated seamlessly without reloading an entire page. A currently popular HTML tree implementation in this context is an AJAX tree written in JAVA SCRIPT that implements an AJAX data processing model. Throughout the summary, drawings, and detailed description the term "AJAX tree" is used in a generic or implementation agnostic sense to represent any HTML tree that utilizes a hierarchical tree structure of Web content for Web pages. The disclosed invention is not to be construed as limited to AJAX specifics, but can apply to HTML trees implemented in any programming language, whether JAVA based or not.

In system 100, a user 105 can select a node of the AJAX tree 120 for expansion. The Web page 115 containing the AJAX tree 120 can request 127 the path array 150 for the selected tree node from a Web server 130 via network 160. A user 105 can access a Web page 115 using client 110. Client 110 can represent a variety of computing devices capable of presenting a Web page 115 and communicating with a Web server 130 over a network 160. The Web page 115 can include an AJAX tree 120 and a path array handler 125.

The AJAX tree 120 can be a presentation of tree data 145 in a tree structure within a Web page 115 utilizing the AJAX Web development technique. The user 105 can perform a variety of predefined actions upon the nodes of the AJAX tree 120. When the user 105 elects to expand a node of the AJAX tree 120, the Web page 115 can generate a path array request 127 for the selected node.

The request 127 can be conveyed to an associated Web server 130 over a network 160. The Web server 130 can be a computing device configured to handle a variety of requests from Web pages 115. The Web server 130 can include an AJAX engine 135 and a data store 140 containing tree data 145.

The AJAX engine 135 can be a software component of the Web server 130 that handles AJAX communications, such as the path array request 127. The AJAX engine 130 can include a path array generator 137. The path array generator 137 can be a software component of the AJAX engine 135 that creates a path array 150 from corresponding tree data 145 for a specific path array request 150. The AJAX tree data 145 can represent the standard data files used to define an AJAX tree 120.

In an alternate embodiment, the path array generator 137 can be a component of the Web server 130 that processes the output of the AJAX engine 135 to convert the output into a path array 150.

The generated path array 150 can be a data structure configured to define the hierarchical path of the user-selected tree node. The path array 150 can be configured such that the first element of the array 150 corresponds to the root node of the AJAX tree 120 and the last element of the array 150 corresponds to the user-selected tree node. Any elements contained between the first and last elements of the path array 150 can correspond to nodes of the AJAX tree 120 that are hierarchically related to the user-selected node. That is, additional nodes of the AJAX tree 120 that must be expanded in order to expose the user-selected node.

It should be noted that the hierarchy expressed within the path array 150 can be searched and manipulated. For example, with this approach, collapsing the last expanded node can be achieved without requesting a new path array 150. In this case, the last element of the path array 150 can be removed and the AJAX tree 120 redrawn using the modified path array 150. Thus, the response and interaction of the AJAX tree 120 is enhanced.

When the Web page 115 receives the path array 150, the path array handler 125 can be invoked. The path array handler 125 can represent a software component invoked by the Web page 115 to manipulate the presented AJAX tree 120 according to the contents of the path array 150. The path array handler 125 can process the path array 150 to determine which nodes of the AJAX tree 120 are to be presented in an expanded state.

Because the data of the AJAX tree 120 is modified asynchronously to the other contents of the Web page 115, issues can arise when a user 105 uses the navigation controls of the Web page 115. For example, when the user 105 uses the BACK button of the browser, the previously-viewed Web page 115 will be loaded, but the display of the AJAX tree 120 can be reset to its original state, since its state changes independently of the Web page 115.

The present invention can be used to address this known issue. The path array 150 can be stored when the loaded Web page 115 changes. The stored path array 150 can be accessed and used to recreate the AJAX tree 120, if needed. The path array 150 can be stored in a cookie (not shown) on the client 110 or within a HyperText Transfer Protocol (HTTP) session variable (not shown) on the Web server 130.

As used herein, presented data store, including store 140, can be a physical or virtual storage space configured to store digital information. Data store 140 can be physically implemented within any type of hardware including, but not limited to, a magnetic disk, an optical disk, a semiconductor memory, a digitally encoded plastic memory, a holographic memory, or any other recording medium. The data store 140 can be a stand-alone storage unit as well as a storage unit formed from a plurality of physical devices. Additionally, information can be stored within data store 140 in a variety of manners. For example, information can be stored within a database structure or can be stored within one or more files of a file storage system, where each file may or may not be indexed for information searching purposes. Further, data store 140 can utilize one or more encryption mechanisms to protect stored information from unauthorized access.

Network 160 can include any hardware/software/and firmware necessary to convey data encoded within carrier waves. Data can be contained within analog or digital signals and conveyed though data or voice channels. Network 160 can include local components and data pathways necessary for communications to be exchanged among computing device components and between integrated device components and peripheral devices. Network 160 can also include network equipment, such as routers, data lines, hubs, and intermediary servers which together form a data network, such as the Internet. Network 160 can also include circuit-based communication components and mobile communication components, such as telephony switches, modems, cellular communication towers, and the like. Network 160 can include line based and/or wireless communication pathways.

Figure 2:
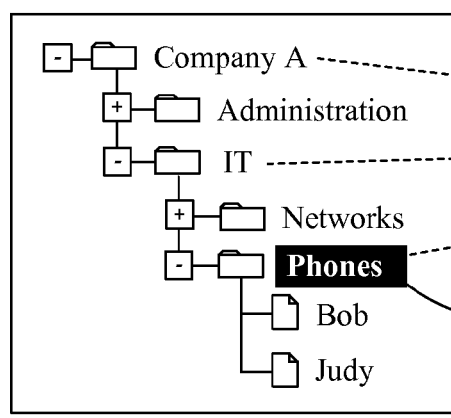
FIG. 2 is an illustration of depicting the relationship between an HTML tree presentation and a path array in accordance with an embodiment of the inventive arrangements disclosed herein.

FIG. 2 is an illustration 200 of depicting the relationship between an AJAX tree presentation 205 and a path array 215 in accordance with an embodiment of the inventive arrangements disclosed herein. The samples 205 and 215 of the illustration 200 can be utilized by system 100 or any other system that uses an array representation of the hierarchical path of a tree node in an AJAX tree. It should be noted that the samples 205 and 215 shown in illustration 200 are for illustrative purposes only and are not meant as absolute limitations or interpretations of the present invention.

In this example, the sample AJAX tree presentation 205 can display data about Company A in an interactive tree structure. For the sake of illustration, a user elects to expand the "Phone" node 210 of the tree. The sample path array 215 can represent the array data structure returned by the AJAX engine containing the hierarchical path for the user-selected tree node.

The path array 215 can include an index number 220 and an associated value 225. The index number 220, as with a typical array data structure, can represent an ordering value of the array elements. It should be noted that the array indexing schema is dependent on the programming language used. This example uses a zero-based indexing schema.

The value 225 can identify a tree node. The value 225 can be related to an attribute that uniquely identifies the tree node, such as a node ID. In this example, the array element with an index 220 of zero and value 225 of "Root_Node" corresponds to the node in the tree presentation 205 with the label "Company A", which is the root node of the AJAX tree.

The array element with an index 220 of one and value 225 of "IT_Node" corresponds to the node in the tree presentation 205 with the label "IT". This node is a child node of the root node and the parent node of the selected node 210. The array element with an index 220 of two and value 225 of "Phone_Node" corresponds to the user-selected node 210 in the tree presentation 205 with the label "Phones".

Therefore, the ancestry of the selected node 210 is can be described by the path array 215. Further, the path array 215 can convey which tree nodes need to be expanded in order to reach the selected node 210.

FIG. 3 is a sample path array handler 300 for using an array representing the hierarchical path of a tree node to manipulate an AJAX tree in accordance with an embodiment of the inventive arrangements disclosed herein. The sample path array handler 300 can be performed within the context of system 100. It should be noted that the code 305-355 of the sample path array handler 300 is for illustrative purposes only and is not meant as an absolute implementation of the present invention. As such, the sample path array handler 300 in this example uses commands provided in the DOJO framework.

The sample path array handler 300 can contain software code 305-355 that can be executed in order to process a received path array, resulting in the alteration of an AJAX tree presentation. Line 305 can contain a declaration of the path array handler 300. In this example, the name of the path array handler 300 is "expandByPath". The path array handler 300 can require input parameters 307 corresponding to the path array and an index number.

In line 310, a local variable can be declared and initialized to contain a copy of the current AJAX tree. Line 315 can determine if the index number parameter is for the root node of the AJAX tree. In line 320, it can be determined if the path array contains a data element at an index number one increment higher than the index number parameter.

When a data element exists at this index number, then line 325 can be executed where a deferred variable can be declared and initialized to contain the portion of the AJAX tree expanded at the node identified by the name or value contained within path array at the index value equal to the received parameter 307. In line 330, a recursive call to the path array handler 300 can be made to expand the AJAX tree for the next node in the path array. Therefore, the path array handler 300 can continue to walk through the hierarchy defined by the path array to expand each node in the ancestry of the selected node, including the selected node.

It should be noted that any children nodes of the selected node will not be expanded because the selected node is the last element of the path array. This means that a data element cannot exist in the path array beyond the index number of the selected node. Therefore, line 320 will evaluate as FALSE and line 325 cannot execute, which would expand the children nodes of the selected node.

When line 320 evaluates as FALSE, line 335 can be executed, which initiates the ELSE clause of the IF-THEN-ELSE control structure. Line 340 can determine if a node of the AJAX tree is selected. In line 345, a variable can be declared and initialized to contain the selected tree node. If the node exists as evaluated in line 350, then line 355 executes where the last element of the path array is reselected in the AJAX tree.

The functionality of the path array handler 300 can be illustrated by an example using the illustration 200 of FIG. 2. For illustrative purposes, let us begin with a function call to the path array handler 300 of "expandByPath (path, 0)", using the sample path array 215 and a starting index 220 of zero.

Line 310 executes, creating a copy of the AJAX tree in the variable "_this". Line 315 evaluates as TRUE, since negative zero times zero is equal to zero. Line 320 also evaluates as TRUE, since a data element exists in the path array 215 with an index 220 of one.

Line 325 executes, creating a deferred variable expands the "Root_Node", index 0, of the AJAX tree. Line 330 executes, calling the path array handler 300 and passing it the path array 215 and an index value of one.

Line 310 executes again, creating a copy of the AJAX tree with the "Root_Node" expanded in the variable "_this". Line 315 evaluates as FALSE, since negative one times one is not equal to zero. Line 320 evaluates as TRUE, since a data element exists in the path array 215 with an index 220 of two.

Line 325 executes, creating a deferred variable that expands the "IT_Node", index one, of the AJAX tree. Now, the AJAX tree has the nodes labeled "Company A" and "IT" expanded. Line 330 executes, calling the path array handler 300 again and passing it the path array 215 and an index value of two.

Line 310 executes again, creating a copy of the AJAX tree with both the "Root_Node" and the "IT_Node" expanded in the variable "_this". Line 315 evaluates as FALSE, since negative two times two is not equal to zero. Line 320 evaluates as FALSE, since a data element does not exist in the path array 215 with an index 220 of three.

The ELSE clause executes, starting with line 335. Line 340 evaluates as TRUE, since it was assumed that the user selected this node to expand. Line 345 executes, creating the variable "ts" and initializing it with the tree node corresponding to the selector, which is the "Phone_Node".

Line 350 evaluates as true, since the "Phone_Node" exists. Line 355 executes reselecting the tree node that corresponds to the last element of the path array 215, which is the "Phone_Node". Therefore, the node of the AJAX tree labeled "Phones" is selected.

Each recursive call ends, resulting in an AJAX tree in the variable "_this" that looks like the AJAX tree presentation 205 of FIG. 2. The created tree can then be passed to additional functions for additional processing and presentation within in the Web page.

Figure 4:
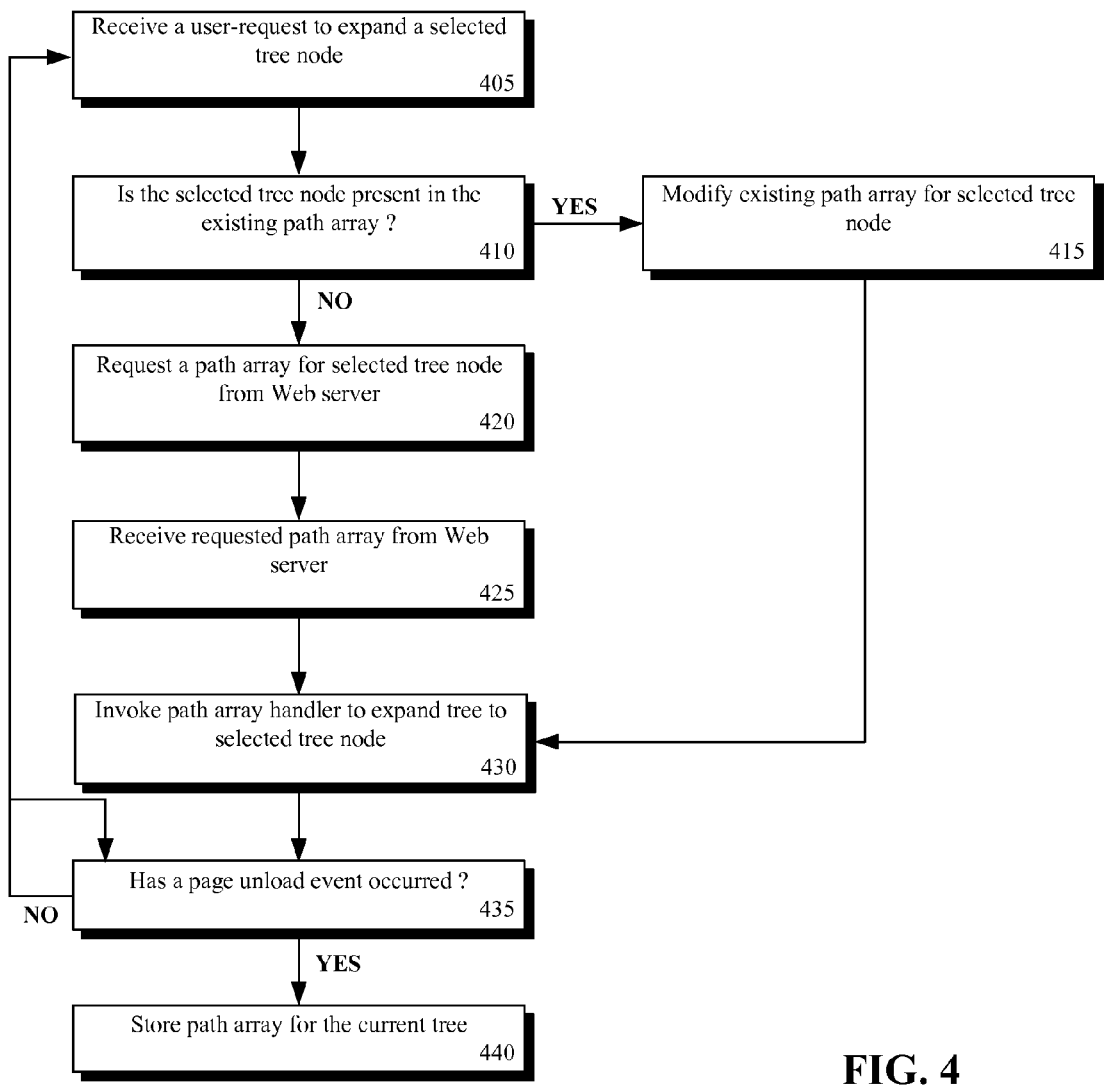
FIG. 4 is a flow chart of a method for using an array representing the hierarchical path of a tree node to manipulate an HTML tree in accordance with an embodiment of the inventive arrangements disclosed herein.

FIG. 4 is a flow chart of a method 400 for using an array representing the hierarchical path of a tree node to manipulate an AJAX tree in accordance with an embodiment of the inventive arrangements disclosed herein.

Method 400 can begin with step 405 where a user-request to expand a selected tree node of an AJAX tree can be received. In step 410, it can be determined if the selected tree node is present in the existing path array.

If the selected tree node is present in the existing path array, then step 415 can execute where the existing path array can be modified to reflect the selected tree node. From step 415, flow can proceed to step 430.

If the tree node is not present in the existing path array, then step 420 can execute where a request can be made to the Web server for a path array for the selected tree node. In step 425, the requested path array can be received from the Web server. The path array handler can be invoked to expand the AJAX tree in step 430.

In step 435, it can be determined is a page unload event has occurred. When a page unload event has occurred, step 440 can execute where the path array for the current AJAX tree can be stored. When a page unload event has not occurred, then flow can proceed to either step 405 or 435 where the system waits to receive a new user-request or determine the occurrence of a page unload event.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for manipulating the presentation of an AJAX tree using an array representing the hierarchical path of a tree node comprising:

receiving a user-request to expand a user-selected tree node of an AJAX tree, wherein the AJAX tree is presented within a Web page;

determining a presence of the tree node in an existing path array for the AJAX tree, wherein the existing path array is stored in one of a Web cookie or a Hyper Text Transfer Protocol (HTTP) session variable;

when the tree node is present in the existing path array, modifying the existing path array to reflect the user-selected tree node;

when the tree node is absent from the existing path array, requesting a path array for the tree node from a Web server associated with the Web page; and invoking a path array handler to expand the AJAX tree, wherein each tree node of the AJAX tree expanded by the path array handler is contained within the existing path array.

2. The method of claim 1, wherein the requested path array is provided by a path array generator, wherein the path array generator is a component of an AJAX engine operating on the Web server.

3. The method of claim 1, wherein the modifying step further comprises:

removing a data element from a last position of the existing path array; and repeating the removing step until the user-selected tree node is in the last position of the existing path array.

4. The method of claim 1, further comprising: detecting a page unload event of the Web page; and responsive to detecting the page unload event, storing the existing path array in a location accessible by the Web page.

5. The method of claim 4, wherein the location accessible by the Web page includes at least one of a Web cookie and a Hyper Text Transfer Protocol (HTTP) session variable.

6. The method of claim 4, wherein the page unload event is one of a refresh event, a backward-navigation event, and a forward-navigation event.

7. The method of claim 4, further comprising:
receiving a page reload event for the Web page;
retrieving the existing path array from the location; and
invoking the path array handler to present the AJAX tree expanded according to the existing path array.

8. The method of claim 7, wherein the page reload event is one of a refresh event, a backward-navigation event, and a forward-navigation event.

9. The method of claim 1, wherein the existing path array contains a plurality of data elements, wherein the plurality of data elements represent a hierarchal order of expanded tree nodes contained within the AJAX tree.

10. The method of claim 1, wherein said steps of claim 1 are performed by at least one machine in accordance with at least one computer program stored in a computer readable media, said computer programming having a plurality of code sections that are executable by the at least one machine.

11. A system that enhances the manipulation of an AJAX tree presentation using an array to represent the hierarchical path of a tree node comprising:

one or more processors;

one or more memories storing program instructions able to be executed by at least one of the one or more processors;

an AJAX tree, stored in at least one of the one or more memories, configured to asynchronously and incrementally load data presented in a tree structure within a Web page;

an AJAX engine, comprising at least a subset of the program instructions, configured to:
  determine a presence of a user-selected tree node of the AJAX tree in an existing path array for the AJAX tree, wherein the existing path array is stored in one of a Web cookie or a HyperText Transfer Protocol (HTTP) session variable; and
  provide a path array for the user-selected tree node of the AJAX tree, when the user-selected tree node is absent from the existing path array, wherein the path array contains data elements corresponding to tree nodes of the AJAX tree; and
a path array handler, comprising at least a subset of the program instructions, configured to process the data elements of the path array to alter a presentation of the AJAX tree for the user-selected tree node.

12. The system of claim 11, said AJAX engine further comprises:
a path array generator, comprising at least a subset of the program instructions, configured to create the path array for the user-selected tree node from a set of AJAX tree data.

13. The system of claim 12, wherein the path array generator converts an output stream of the AJAX engine into the path array.

14. The system of claim 11, wherein the path array handler is written in a scripting language contained within the Web page.

15. The system of claim 11, wherein the path array handler extends a capability of an existing AJAX tree widget framework.

16. The system of claim 11, wherein the data elements of the path array represent a hierarchical order of the tree nodes of the AJAX tree, wherein a first data element corresponds to a root node of the AJAX tree and a last data element corresponds to the user-selected tree node.

17. The system of claim 11, wherein the path array is stored in a location accessible by the Web page upon detection of a page-rendering event, wherein the page rendering event includes one of a refresh event, a backward-navigation event, and a forward navigation event.

18. A non-transitory storage medium storing digitally encoded information for a Web page, which utilizes utilizing an array representation of a user-selected tree node to manipulate the presentation of an AJAX tree comprising:
a path array, stored in the non-transitory storage medium, configured to contain a plurality of data elements, wherein the plurality of data elements represent a hierarchical order of tree nodes of an AJAX tree presented within a Web page, wherein a first data element corresponds to a root node of the AJAX tree and a last data element corresponds to a user selected tree node; and
an AJAX engine, stored in the non-transitory storage medium, configured to:
  determine a presence of the user-selected tree node in an existing path array for the AJAX tree, wherein the existing path array is stored in one of a Web cookie or a HyperText Transfer Protocol (HTTP) session variable; and
  provide the path array for the user-selected tree node of the AJAX tree, when the user-selected tree node is absent from the existing path array; and
a path array handler, comprising program instructions stored on the non-transitory storage medium, said program instructions executable by one or more processors configured to process the plurality of data elements of the path array to alter a presentation of the AJAX tree for the user-selected tree node, wherein the path array handler is written in a scripting language contained within the Web page.

19. The non-transitory storage medium Web page of claim 18, wherein the path array is stored in a location accessible by the Web page upon detection of a page-rendering event, and wherein the page-rendering event includes one of a refresh event, a backward-navigation event, and a forward-navigation event.

* * * * *